Patented Nov. 7, 1933

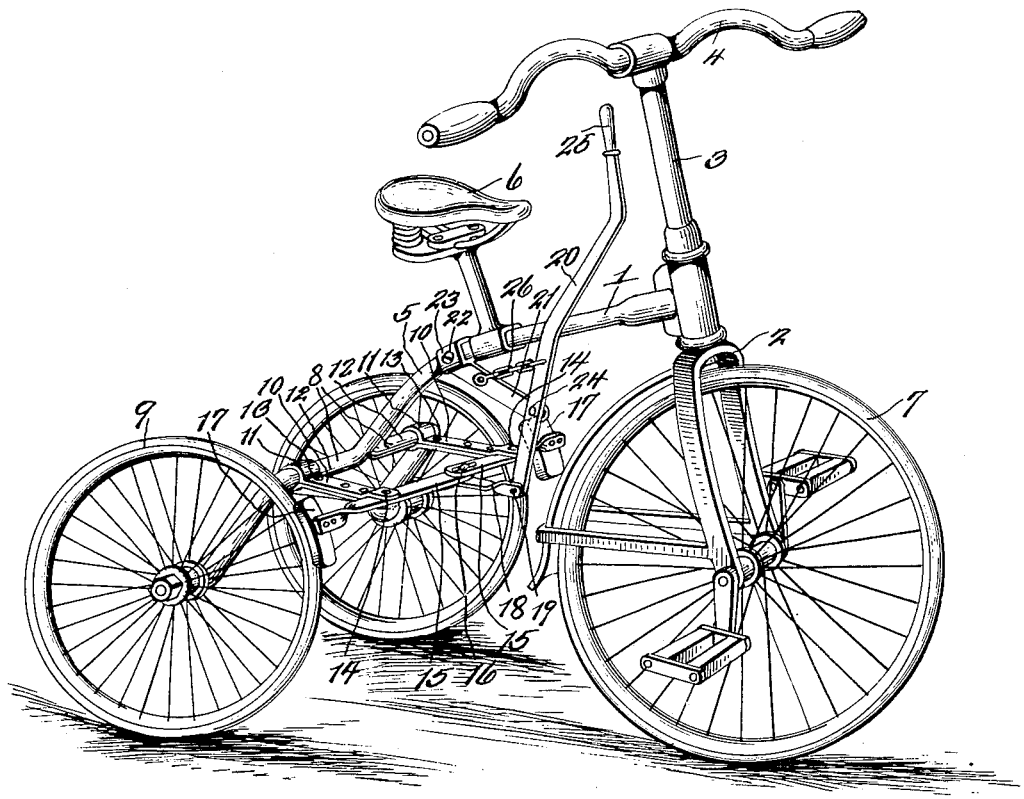

1,933,955

UNITED STATES PATENT OFFICE 1,933,955

BRAKE MECHANISM FOR VELOCIPEDES

Harvey D. Arnold, Philadelphia, Pa.

Application September 15, 1931
Serial No. 562,947

2 Claims. (Cl. 188—24)

Practically all velocipedes on the market and particularly those of the inexpensive kind are without brake mechanisms. Unquestionably it is very dangerous for young children to coast down hill, especially these days where there are so many motor vehicles. It is therefore the purpose of the present invention to provide a brake mechanism of such a construction that the brake shoes may be applied to both side wheels of the velocipede simultaneously and with equal force, the application of the brake shoes being accomplished manually without distracting the operator from other duties, such as steering and propelling the velocipede, the manually operating means being in close position to the handle bars of the velocipede, and in such convenient location as to enable the brake mechanism to be easily and very quickly applied.

It is to be understood that the particulars here-in given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing, the figure illustrated is a perspective view of a velocipede, showing the improved brake mechanism as applied.

Referring to the drawing 1 identifies the frame of a velocipede, comprising the front forks 2, the steering column 3 including the handle bars 4, and the rearwardly extending reach 5, on which the seat 6 is supported. Mounted in the front forks 2 is the usual front wheel 7, and the rearwardly extending reach 5 terminates in a rearwardly and downwardly extending fork 8, upon the lateral parts of which the rear wheels 9 are supported.

Metal straps 10 bent or formed to provide the sleeves or rolls 11, which receive the lateral arms 12 of the fork 8, are disposed to extend forwardly. The opposed parts of the straps 10 are secured together as shown at 13. The sleeves or rolls 11 fit tightly on the lateral arms 12. The forward ends of the opposed parts of the straps 10 are spaced to pivotally receive at 14 levers 15, the adjacent ends of which are united by means of a slot and pin connection at 16. The remote ends of the levers 15 carry brake shoes 17, which assume such positions that when the levers 15 are rocked on their pivots 14 the shoes may engage against the peripheries of the rear wheels 9.

A link 18 is connected to the pivot 16, and is in turn pivoted at 19 to the lower end of a lever 20.

An arm 21 extends downwardly and forwardly from a sleeve 22, which is secured at 23 on the rearwardly and downwardly extending reach 5 of the velocipede. The lever 20 is pivoted at 24 on the arm 21, and the upper end of the lever 20 terminates in a handle 25.

A suitable chain 26 is connected to the arm 21 and in turn to the lever 20, thereby limiting the lever 20 in its forward movement, and in such a manner as to retain the brake shoes 17 relatively close to but not engaging with the peripheries of the rear wheels 9.

When it is desired to apply the brake shoes against the wheels 9, the handle 25 of the lever 20 may be grasped and moved rearwardly. Such movement of the lever 20 pulls upon the pivot 16, and thereby rock the levers 15, in which case the brake shoes will move toward and engage with the peripheries of the rear wheels 9, thereby instantly braking the velocipede. As soon as pressure in a rearward direction on the handle 25 is relieved, positive engagement of the brake shoes with the rear wheels is immediately relieved, thereby allowing the velocipede to roll freely.

The invention having been set forth, what is claimed is:

1. In a brake mechanism for velocipedes, the combination with a frame including a reach which extends from the front rearwardly and downwardly merging at the rear into lateral arms having downwardly extending forks carrying rear supporting wheels, a head operatively swivelled to the front end of the reach and having front forks carrying a front supporting wheel, of a pair of supports fixed to and extending rigidly forwardly from said lateral arms, said supports consisting of straps with their front ends spaced, a pair of brake levers pivoted between the spaced ends of the straps, brake shoes on the remote ends of the brake levers, the inner ends of the brake levers being pivotally united, a link pivoted to the pivotally connected adjacent ends of the brake levers, a sleeve on the upper approximate forward portion of the reach and having a forwardly and downwardly extending arm, an operating lever pivoted on the forwardly and downwardly extending arm with its lower end connected to the link, whereby upon pulling backwardly on the upper end of the lever on the arm, the brake levers may be tilted and the brake shoes applied, and a chain operatively connecting the forwardly and downwardly extending arm and the last named lever, thereby limiting the operating lever in its forward tilted position.

2. In a brake mechanism for velocipedes, the combination with a frame including a reach extending from the front rearwardly and downwardly provided with front forks carrying a front supporting wheel, the rearwardly and downwardly extending portion of the reach including laterally extending horizontal arms, of a pair of straps, bent upon themselves to form sleeves rigidly secured to the lateral arms, said straps extending rigidly forwardly with upper and lower forward ends spaced, brake levers pivoted between the spaced ends of the straps carrying brake shoes on their outer remote ends, the inner adjacent ends of the brake levers being pivotally united, a link connected to the adjacent united ends of the brake levers, a sleeve fixed on the upper portion of the reach and provided with a forwardly and downwardly extending arm, an operating lever pivoted on the lower end of the forwardly and downwardly extending arm with its lower end pivoted to the link, said operating lever having a substantial portion positioned in front of an operator, whereby upon tilting the operating lever rearwardly the brake shoes may be applied, and a chain connecting the forwardly and downwardly extending arm and the operating lever for limiting the latter in its forward position.

HARVEY D. ARNOLD.